(12) United States Patent
Bidwell

(10) Patent No.: US 6,634,114 B2
(45) Date of Patent: Oct. 21, 2003

(54) GAGE SET FOR MEASURING INSIDE AND OUTSIDE DIAMETERS OF RING SHAPED PARTS

(75) Inventor: Steven T. Bidwell, Ellington, CT (US)

(73) Assignee: Bidwell Corporation, Enfield, CT (US)

( * ) Notice: Subject to any disclaimer, the term of this patent is extended or adjusted under 35 U.S.C. 154(b) by 0 days.

(21) Appl. No.: 09/834,071

(22) Filed: Apr. 12, 2001

(65) Prior Publication Data

US 2001/0029677 A1 Oct. 18, 2001

Related U.S. Application Data

(60) Provisional application No. 60/196,686, filed on Apr. 12, 2000.

(51) Int. Cl.[7] .............................. G01B 5/08; G01B 5/12
(52) U.S. Cl. .............................. 33/542; 33/543; 33/549; 33/552; 33/555; 33/555.1
(58) Field of Search ..................... 33/549, 550, 551, 33/552, 553, 554, 555, 555.1, 542, 543

(56) References Cited

U.S. PATENT DOCUMENTS

| 3,296,705 | A | * | 1/1967 | Johnson | 33/548 |
|---|---|---|---|---|---|
| 4,160,329 | A | * | 7/1979 | Scrimshaw | 33/555.1 |
| 4,451,988 | A | * | 6/1984 | McMurtry | 33/561 |
| 4,562,648 | A | * | 1/1986 | Danielli | 33/549 |
| 4,567,670 | A | * | 2/1986 | Roulstone | 33/545 |
| 4,586,261 | A | * | 5/1986 | Beaupere | 33/555 |
| 4,803,783 | A | * | 2/1989 | Tiegs et al. | 33/550 |
| 4,821,425 | A | * | 4/1989 | Currie et al. | 33/555.1 |
| 4,965,937 | A | * | 10/1990 | Hill | 33/199 R |
| 5,056,238 | A | * | 10/1991 | Chi | 33/783 |
| 5,088,337 | A | * | 2/1992 | Bennett | 33/572 |
| 5,231,767 | A | * | 8/1993 | Brinley | 33/522 |
| 5,465,496 | A | * | 11/1995 | Axon | 33/554 |
| 5,647,137 | A | * | 7/1997 | McMurtry et al. | 33/559 |
| 5,711,083 | A | | 1/1998 | Bidwell | |
| 5,791,059 | A | * | 8/1998 | Vaccaro et al. | 33/555.1 |
| 6,327,788 | B1 | * | 12/2001 | Seddon et al. | 33/551 |
| 6,381,861 | B1 | * | 5/2002 | Deterling | 33/555.1 |

\* cited by examiner

*Primary Examiner*—Diego Gutierrez
*Assistant Examiner*—Madeline Gonzalez
(74) *Attorney, Agent, or Firm*—Holland & Bonzagni, P.C.; John A. Kramer, Esq.

(57) ABSTRACT

An adjustable gage comprises a centerline hub and a swing gage. The hub includes a body with position jaws adjustably attached thereto, and a central post. The gage comprises a pair of parallel slide bars and front and rear blocks slidable along the slide bars. A movable, spring-biased probe is slidably connected to the front block via a rail and carriage bearing apparatus. The probe is operably connected to a probe-movement indicator. The rear block has a fixed probe. Both probes have end roller bearings. In use, the part to be measured is placed within the position jaws, previously adjusted to the approximate inner or outer diameter of the part. Then, the gage is placed over the post, with the roller bearings coming into contact with the part, and the gage is rotated. The probes track along the part, with any variances in part diameter showing up on the indicator.

15 Claims, 7 Drawing Sheets

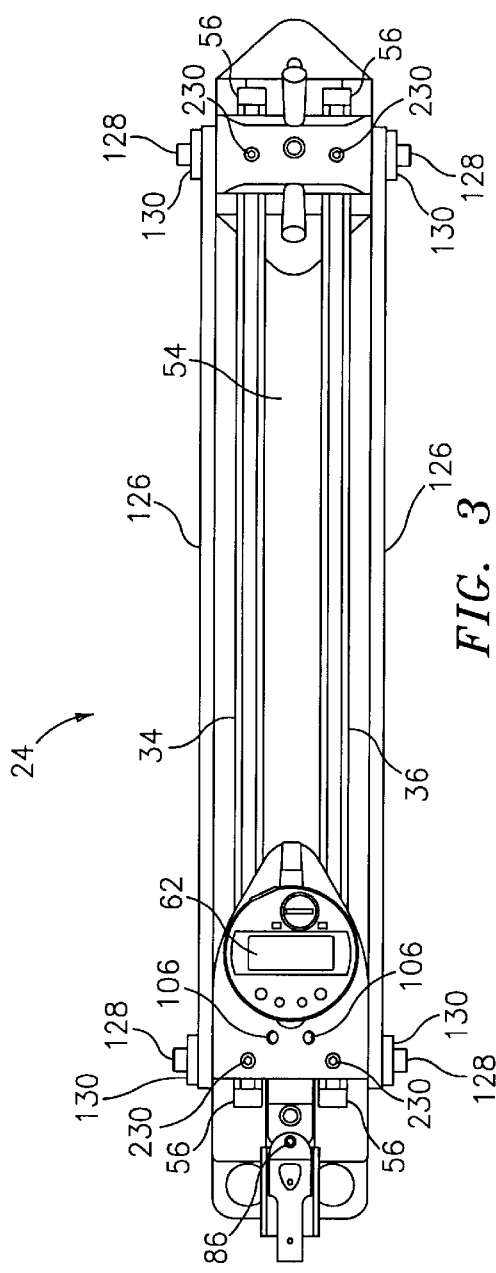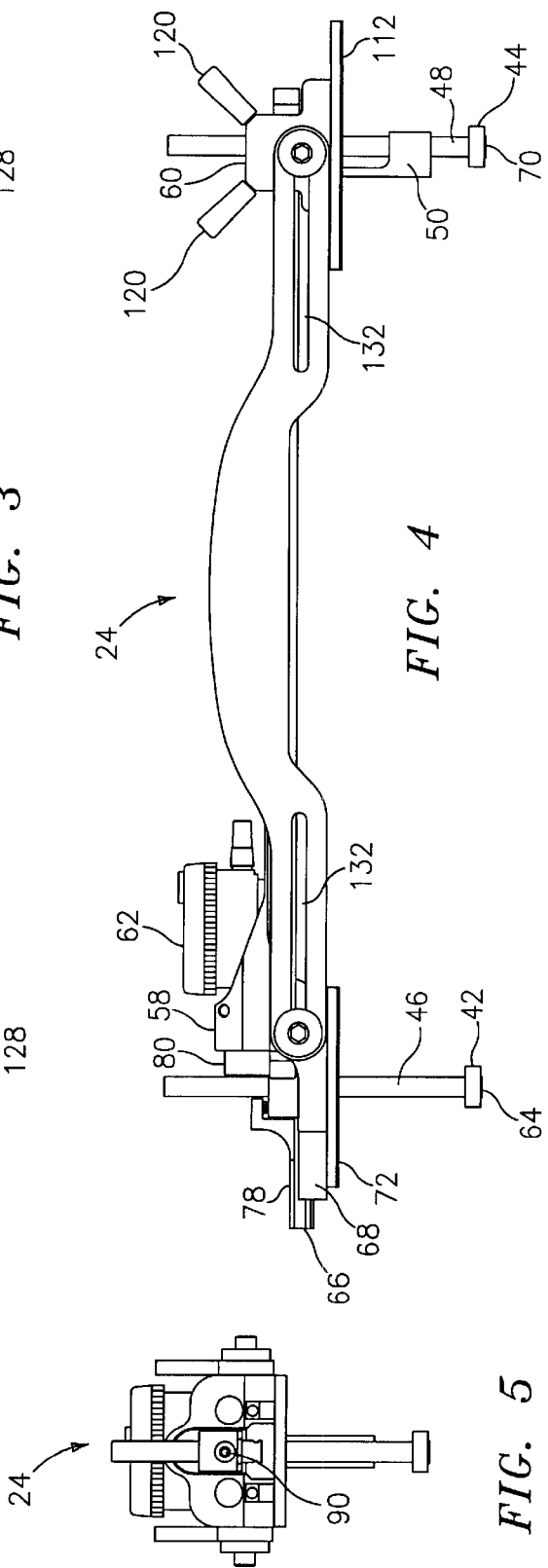

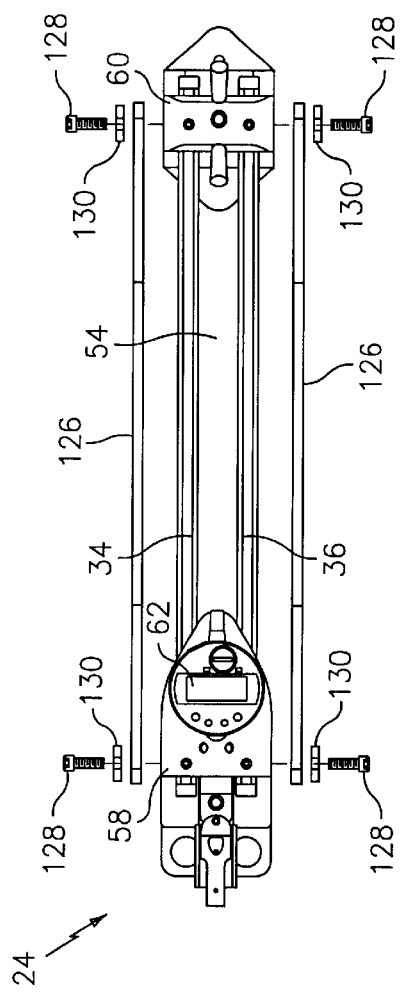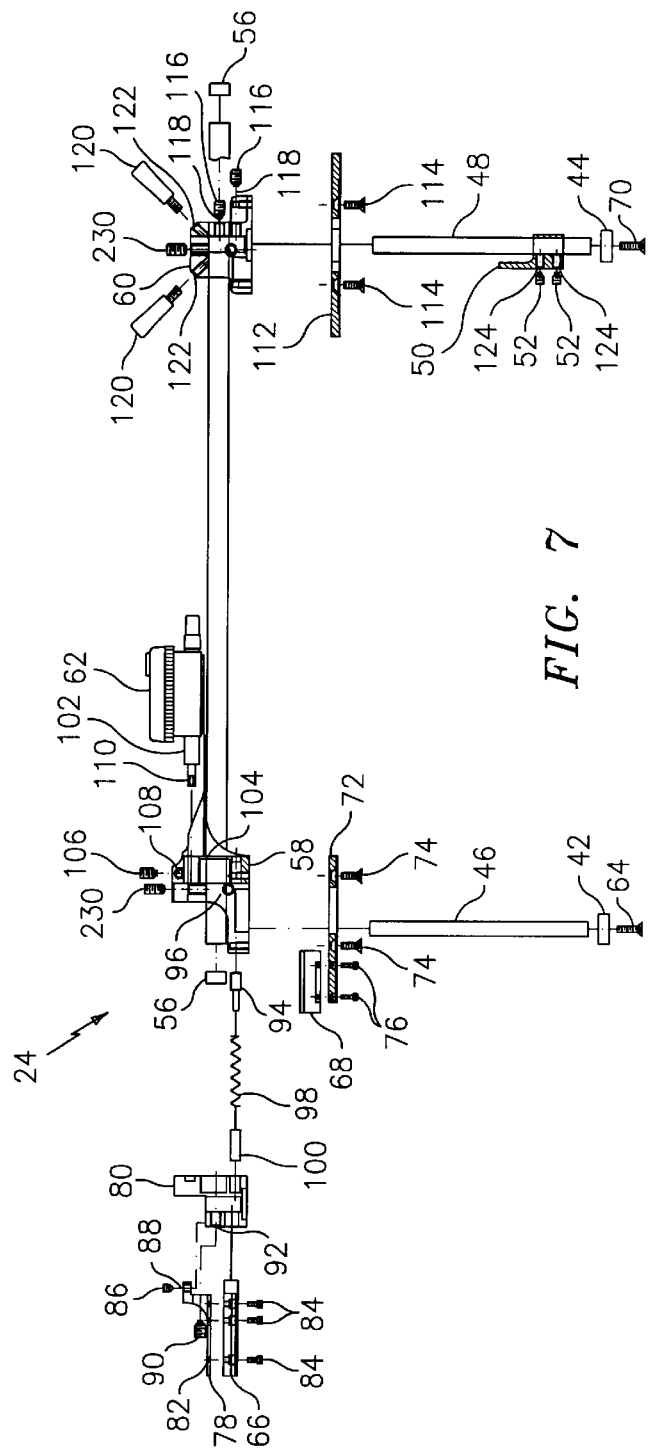
FIG. 6
FIG. 7

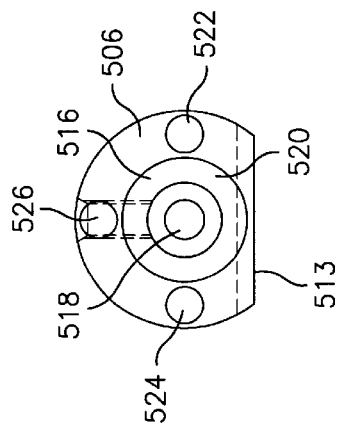
FIG. 13E
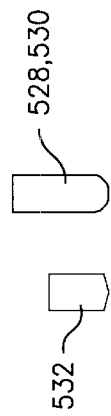
FIG. 13F
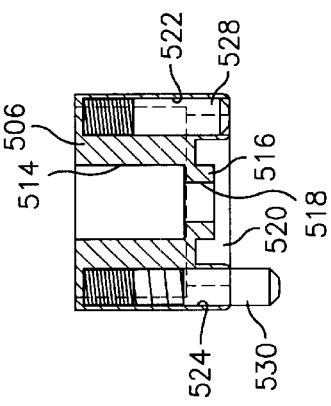
FIG. 13C
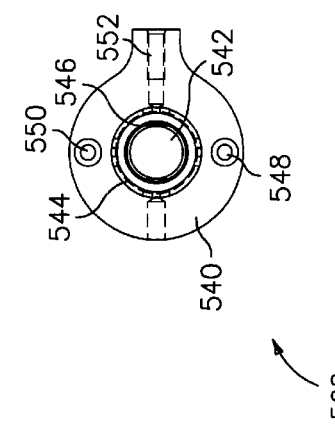
FIG. 13D
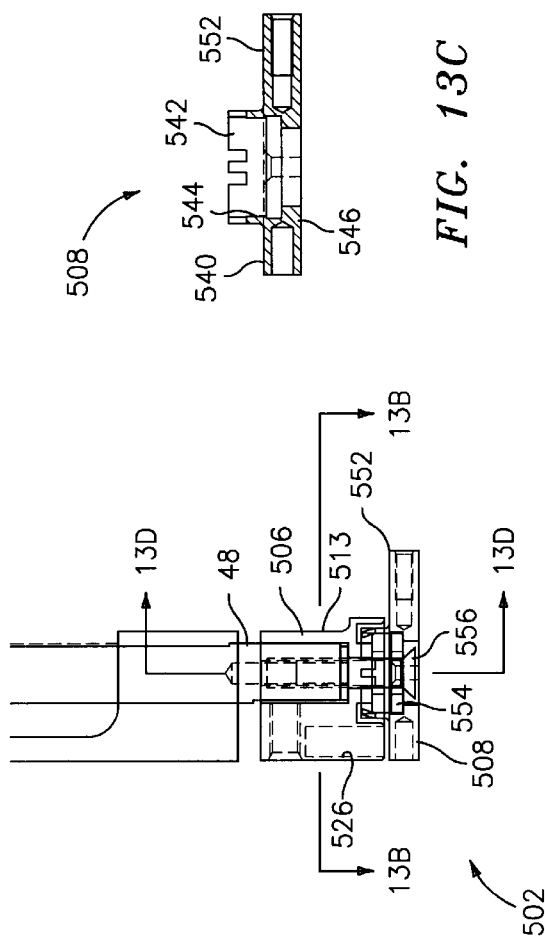
FIG. 13A
FIG. 13B

GAGE SET FOR MEASURING INSIDE AND OUTSIDE DIAMETERS OF RING SHAPED PARTS

This application is based in part on a Provisional Application, Ser. No. 60/196,686, filed Apr. 12, 2000.

FIELD OF THE INVENTION

The present invention relates to machines for testing and measuring parts, and, more particularly, to machines for measuring round or ring-shaped parts.

BACKGROUND OF THE INVENTION

As explained in U.S. Pat. No. 5,711,083, issued Jan. 27, 1998 to the assignee of the present application, machining facilities commonly must inspect both size and out-of-roundness condition on internal and external diameters of ring-shaped parts. In the past, this has been performed by many of the prior art gages. Due to the way that these gages were designed, there were many inherent problems that were accepted as common practice when one used this type of gage.

These measurement problems were significantly reduced or even eliminated with the introduction of the gage set disclosed in aforementioned U.S. Pat. No. 5,711,083 (the "original gage set"). The present application is for a new style of swing gage, in combination with a unit to keep the swing gage on the actual centerline of the part to be measured.

There are several significant differences between the original gage set and the present one disclosed in this application. First and foremost is the incorporation of a unique type of bearing to drive the probe. Prior art gages use a spring probe that mechanically interfaces with a plunger on a dial indicator. The present design uses a profile rail and carriage bearing setup. This concept has never been used in this type of application before. To put this application in layman's terms, one should think of a train's wheels going down a track that is fastened to the ground. This concept has now been reversed. The train is fastened to the ground, and the track is running along the wheels of the train. No other gage has this design. Additionally, another distinct feature of this design is that the bearing and profile rail are permanently aligned for virtually maintenance free operation.

Another unique feature on the present swing gage is the use of roller bearings on the contact probes. Prior art gages have metal-to-metal contact between the surface of the probe and the part being measured. This can cause scoring of the part, particularly if the part to be measured is made from a soft material or is coated. This new concept of using a roller bearing makes for a virtually friction-free environment between the part being measured and the surface of the contact probes. Side supports are attached to each side of the swing gage to minimize or eliminate the sagging condition that occurs in prior art gages. Furthermore, a datum plate (which is attached to the center post of the unit that centers the gage) aids in the inspection of parts having irregular top faces, and also eliminates the application of weight to the top of the part. This prevents the part from being distorted, a condition that could lead to a false measurement. This unit can also be slid up and down the center protruding post to check for taper in the part being measured.

Still further, the construction of the swing gage allows for minimal thermal expansion due to environmental conditions. Prior art gages are susceptible to thermal expansion because body temperature can effect the accuracy of measurement.

Also, a support device connected to the contact probe prohibits deflection of the probe when it is extended out. Prior art gages do not have this feature. This can severely effect the measurement as testing has proven.

Finally, a new concept to enhance the ability to locate the swing gage at the actual centerline of the part has been designed. It incorporates some of the features of the original gage set, but with some added features. This new design has the ability to locate the ring-type part to be measured by either the outside diameter or the inside diameter. The old design could only locate the part from the inside diameter. Also, thin or flexible rings can be inspected by spinning the part around the reference-end contact probe. This is important because the spring pressure of prior art gages could easily distort a thin ring. These added features greatly multiply the potential applications for this gage set.

SUMMARY OF THE INVENTION

An adjustable gage is positionable at the actual centerline of a ring-shaped part, and quickly and accurately measures the size of the part and certain conditions of the part, such as out-of-roundness. According to a preferred embodiment, the gage of the present invention comprises two separate components. The first component is an "EZ-MATE™" centerline hub that comprises a centrally-located body and a cylindrical post protruding up vertically from the center of the body. The unit has three slots formed on the top surface into which three position jaws are adjustably positioned.

The second component of the present invention is a DIRECT-STYLE™ swing gage that comprises a pair of cylindrical slide bars that are oriented in parallel. Front and rear blocks are positioned on the corresponding ends of the two slide bars. The blocks are adjustable to predetermined positions on the corresponding ends of the two slide bars. The front block has associated with it a dial or electronic indicator and a corresponding movable probe that is driven and guided by a profile rail and carriage bearing (e.g., the probe is attached to the profile rail, which is slidably disposed within the carriage bearing). The probe has a roller bearing on the end that will come into contact with the part to be measured. The dial or electronic indicator visually indicates any movement of the probe. The rear block also has a probe and a roller bearing associated therewith; however this probe is in a fixed position.

In use, the position jaws of the EZ-MATE™ centerline hub are adjusted using, e.g., a depth micrometer or vernier calipers, to the approximate inner or outer diameter of the part to be located within. The part to be checked is then placed over the top and positioned within the three position jaws. This will guide the part into position, thereby creating an actual centerline between the part and the centerline post of the EZ-MATE™ centerline hub.

Next, after setting the contact probes at an appropriate distance from one another, whether it be for an outside or an inside diameter, the two parallel slide bars of the DIRECT-STYLE™ swing gage are straddled over the centerline post such that the post is located in the slotted opening between the two bars. The roller bearings associated with the contact probes will come in contact with the part to be measured.

To check the size and out of roundness of the part, the user merely rotates the DIRECT-STYLE™ swing gage around the centerline post of the EZ-MATE™ centerline hub by grasping either of the vertical swivel handles that protrude from the rear block. As the DIRECT-STYLE™ swing gage rotates, the roller bearings that are attached to the probes are in contact with inner or outer surface of the part. These roller bearings will rotate around the part surface and the contact probe. The probe on the front block will move the profile rail in and out along the carriage bearing that is attached to the front block and will push the plunger on the indicator in and out. By observing this movement on the indicator, the user can arrive at a quick and accurate measurement and a determination of whether the part is within the dimensional specifications.

BRIEF DESCRIPTION OF THE DRAWINGS

FIG. 3 is a top view of a DIRECT-STYLE™ swing gage;

FIG. 4 is a side view of the swing gage;

FIG. 5 is a left end view of the swing gage;

FIG. 6 is a top exploded view of the swing gage shown in FIG. 3;

FIG. 7 is a side exploded view of the swing gage shown in FIG. 4;

FIGS. 13A–13F are various detailed views of the second alternative probe end-tip shown in FIG. 12.

DETAILED DESCRIPTION OF THE PREFERRED EMBODIMENTS

Figure 1:
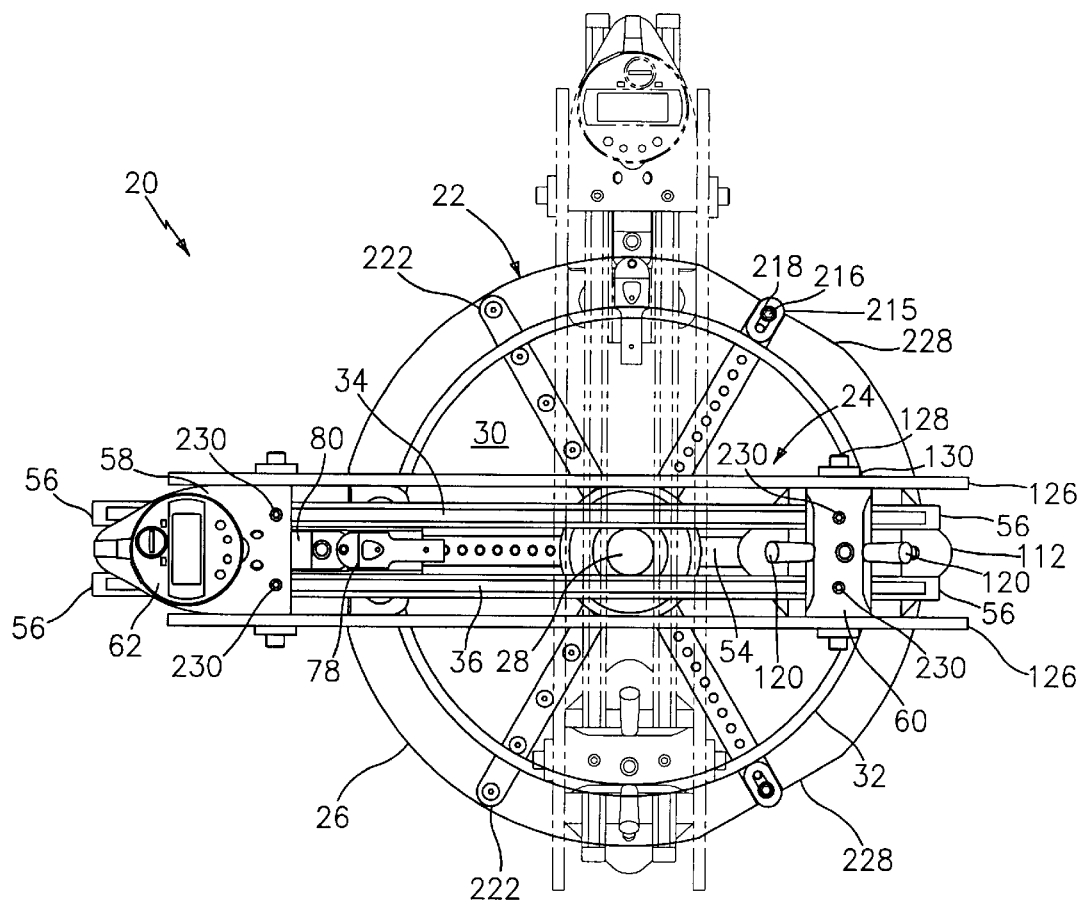
FIG. 1 is a top view showing a gage set of the present invention in use with a ring shaped part.

Referring to the drawings in detail, various preferred embodiments of a gaging device according to the present invention are described and illustrated therein in which the gage is generally designated by the reference numeral 20. In one preferred embodiment, the gage 20 comprises a "set" of two separate components: an EZ-MATE™ centerline hub 22 and a DIRECT-STYLE™ swing gage 24. The centerline hub 22 comprises a centrally-located body 26 with a cylindrical post 28 protruding up vertically from the center of the body 26. As illustrated in FIG. 1, the body 26 is disposed within the centrally-located opening 30 of a ring shaped part 32. The DIRECT-STYLE™ swing gage 24 has a pair of cylindrical slide bars 34, 36 that position the swing gage 24 over the cylindrical post 28 of the centerline hub 22. As illustrated in FIG. 1, the swing gage 24 can be rotated about the centerline hub 22 to obtain measurements of the size and out-of-roundness of the ring-shaped part 32.

Figure 2:
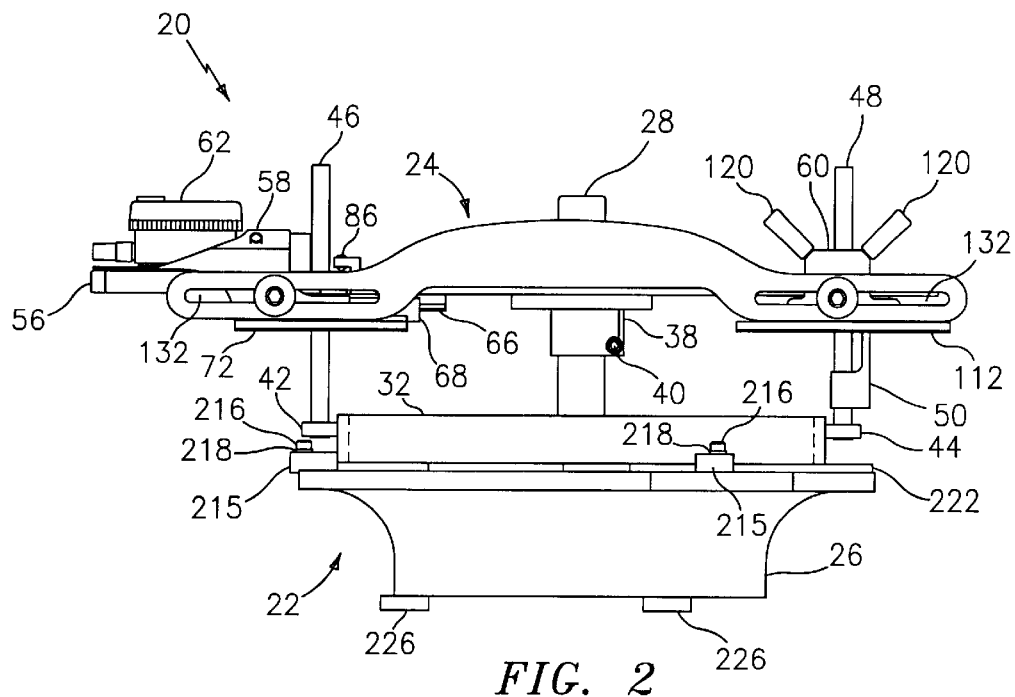
FIG. 2 is a side view of the gage set shown in FIG. 1.

FIG. 2 shows a datum plate 38 attached to the centerline post 28 of the centerline hub 22 via a socket head cap screw 40. The slide bars 34, 36 of the swing gage 24 rest upon the top surface of the datum plate 38. This application is useful for parts that have an irregular top surface, or to check for taper by sliding the datum plate 38 up and down the centerline post 28 of the swing gage 24. The use of the datum plate 38 also eliminates the application of weight to the top of the part, which prevents the part from being distorted, a condition that could lead to a false measurement.

FIG. 2 also illustrates the manner in which roller bearings 42, 44 are secured to the contact probes 46, 48 of the swing gage 24 and make contact with the outside diameter of the ring-shaped part 32. Finally, FIG. 2 illustrates use of a probe support 50 attached to the contact probe 48 via nylon tip set screws 52 (shown in exploded view in FIG. 7). The probe support 50 is useful in minimizing deflection of the contact probe 48. This aids in a more accurate measurement of the ring-type part 32.

Referring to FIGS. 3–7, a preferred embodiment of the DIRECT-STYLE™ swing gage 24 component of the gage set 20 is shown. The pair of cylindrical slide bars 34, 36 are oriented in parallel such that an opening 54 is created therebetween. The ends of the slide bars 34, 36 may be provided with caps 56. The size of the opening 54 is selected to correspond to the diameter of the cylindrical post 28 of the EZ-MATE™ centerline hub 22, since, as described in greater detail hereinafter, the post 28 fits into this opening 54 when the gage is used (see FIG. 1). The bars 34, 36 can be of any suitable length.

Front and rear blocks 58, 60 are positioned along the slide bars 34, 36. The blocks 58, 60 are adjustable to predetermined positions along the slide bars 34, 36, wherein the positions depend upon the inside or outside diameter of the part 32 to be checked. The front block 58 has associated with it a dial or electronic indicator 62, commercially available, and the corresponding adjustable probe 46 on which is attached the roller bearing 42 by means of a flat head screw 64 in a tapped hole on the end of the probe 46. The probe 46 is driven by a profile rail 66 that slides along a carriage bearing 68. Any deflection of the probe 46 is indicated by the dial or electronic indicator 62. Relative to the prior art gages that rely solely on spring pressure to drive the probe, this combination of profile rail 66, carriage bearing 68, and roller bearing 42 makes for more accurate and less cumbersome measurement. The rear block 60 has the fixed probe 48 with the roller bearing 44 attached to it by means of a flat head screw 70 screwed into a tapped hole provided in the contact probe 48. The blocks 58, 60 easily disassemble from the slide bars 34, 36 for compact storage.

Referring particularly to the exploded view of the swing gage 24 in FIG. 7, the front block 58 has a lower contact plate 72 fastened to the block 58 by a plurality of flat head screws 74 that fit into tapped holes in the block 58. This plate is formed out of heat treated stainless steel for long lasting wear since the lower surface of this plate may come in contact with the part 32 to be checked. The carriage bearing 68 is fastened to the lower contact plate 72 by a plurality of socket head screws 76 that fit into tapped holes provided in the carriage bearing 68. The carriage bearing 68 is preferably composed of a hard plastic that has a close tolerance slot through the center of it. The plastic sheaths a multitude of permanently greased hardened steel ball bearings that run along the center slot.

The moving probe assembly comprises the profile rail 66, a connector bracket 78, a probe connector 80, and the probe 46 itself. The profile rail 66 is fastened into corresponding tapped holes 82 in the connector bracket 78 with a plurality of socket head cap screws 84. The connector bracket 78 aids in supporting the probe connector 80 and the probe 46 by means of applying pressure to a cone head screw 86 that fastens in a tapped hole 88 in the connector bracket 78. The probe 46, which slip fits into a corresponding hole in the probe connector 80, is held in place by a nylon-tipped set screw 90 that is screwed into a tapped hole 92 provided in the probe connector 80 (see FIG. 5). These and other parts may have a protective finish applied thereto for appearance purposes and as a prevention against rust and corrosion.

The profile rail 66 is a hardened steel rectangular member that mates with the slot in the carriage bearing 68. The profile rail 66 slides in and out within the slot and along the ball bearings within the carriage bearing 68 (of course, as the profile rail 66 moves, so too do the connector bracket, probe connector, and probe). A spring guide 94 is press fit into a hole 96 in the front block 58. A compression spring 98 and a spring jacket 100 slide over the spring guide 94. A stem 102 on the dial or electronic indicator 62 is positioned in a hole 104 in the front block 58, and is held in place by a plurality of nylon-tipped set screws 106 screwed into a plurality of tapped holes 108 provided in the front block 58. An actuator 110 of the indicator 62 is not connected to the probe 46. Rather, the actuator 110 is biased at approximately a center point of its potential travel to abut the probe 46 (specifically, the probe connector 80) and track the probe's movement.

The compression spring 98 biases the probe 46 away from the indicator 62, and ensures continuous contact between the roller bearing 42 of the probe 46 and the surface (inside or outside diameter) of the part 32. To measure an outside diameter, the probe assembly (probe 46, profile rail 66, carriage bearing 68, indicator 62, etc.) is oriented on the DIRECT-STYLE™ swing gage 24 as shown in FIGS. 1 and 2, with the indicator 62 facing away from the center of the gage set. To measure an inside diameter, the probe assembly is "turned around" 180°, as shown in FIGS. 3 and 4, with the indicator 62 facing towards the center of the gage set.

The rear block 60 has a steel contact plate 112 fastened to the block 60 by a plurality of flat head screws 114 that fit into corresponding tapped holes in the block 60. The rear block contact probe 48 slip fits into a corresponding hole in block 60. This rear contact probe also has the roller bearing 44 attached to it by means of the flat head screw 70 that fastens into a tapped hole in the end of the rear contact probe 48. The probe 48 is held in place by means of two nylon tipped set screws 116 that fit into two tapped holes 118 provided in the rear block 60. Two handles 120 screw into tapped holes 122 provided in the top of the rear block 60. These handles 120 may revolve with respect to the block 60. The probe support 50 is attached to the probe 48 by means of the two nylon tipped set screws 52 that fit into two tapped holes 124 provided in the probe support 50.

Referring particularly to FIGS. 3, 4, and 6, a side support 126 (preferably made of aluminum for lightweight construction) is attached on each side of the front and rear blocks 58, 60 by means of a plurality of socket head cap screws 128 and hardened washers 130 that screw into corresponding holes in the front and rear blocks 58, 60. Each side of each side support 126 has slots 132 milled therein for adjustment and to accommodate the socket head cap screws 128. These side supports 126 aid in eliminating any sagging that may occur.

Referring to FIGS. 1 and 8–10, the EZ-MATE™ centerline hub 22 comprises the centrally-located body 26 with the interchangeable cylindrical post 28 protruding up vertically from the center of the body 26. The post 28 is interchangeable in that a plurality of different posts may be utilized, with the primary difference between the posts being the length of the post, which corresponds to the height the post 28 achieves above the body 26. Each post 28 has an internal threaded hole 200 formed at the bottom of the post 28. The alignment between the post 28 and the EZ-MATE™ body 26 is obtained by a close tolerance counterbore 202 formed at the center of the body 26 and a flange 204 on the bottom of the post 28, whose size is selected to correspond to the diameter of the counterbore 202. The post 28 is held in position by means of a knurled-head screw 206, a disk washer 208, and a hardened washer 210. The thread on the knurled-head screw 206 fastens to the threaded hole 200 in the post 28.

In an exemplary preferred embodiment, the body 26 has three slots 212 formed therein with a series of equally spaced tapped holes 214 along the length of each slot 212 into which are slidably positioned three corresponding positioning elements or jaws 215. The position jaws are held in a desired position in the slots 212 by associated socket head cap screws 216 and hard washers 218. Each position jaw 215 has a clearance slot 220 milled in it to accommodate socket head cap screws 202. The clearance slots 220 are elongated to allow the position jaws 215 to be finely adjusted after the screws 216 are screwed into the tapped holes 214 (to adjust the position jaws, the screws 216 are simply loosened without being fully removed from the holes 214). Three contact rails 222 are equally spaced around centerline of the body 26 and are held in place by a plurality of flat head screws 224 screwed into corresponding tapped holes formed in the body 26. For durability, the contact rails 222 are preferably made out of hardened steel. A plurality of knurled-head screws 226 fasten into corresponding tapped holes in the bottom surface of the body 26. The knurled head screws 226 are adjustable for leveling the EZ-MATE™ centerline hub 22, and provide a wear resistant surface.

To set up and operate the gage 20 of the present invention, the inside or outside diameter of the part 32 to be checked is determined and the position jaws 215 are adjusted for this diameter using standard shop tools such as, e.g., a depth micrometer or vernier calipers.

In an exemplary case of a part 32 having an outside diameter of 6.000 inches, the hub body 26 is "set" to a diameter of 6.010 inches by adjustment of the position jaws 215. The hub body 26 is purposely set larger than the diameter of the part 32 for clearance reasons to allow for out-of-roundness conditions. This procedure would be reversed if setting the position jaws 215 for an inside diameter of a part 32. This feature of being able to locate the outside diameter or an inside diameter is an added feature over the prior art.

Figure 8:
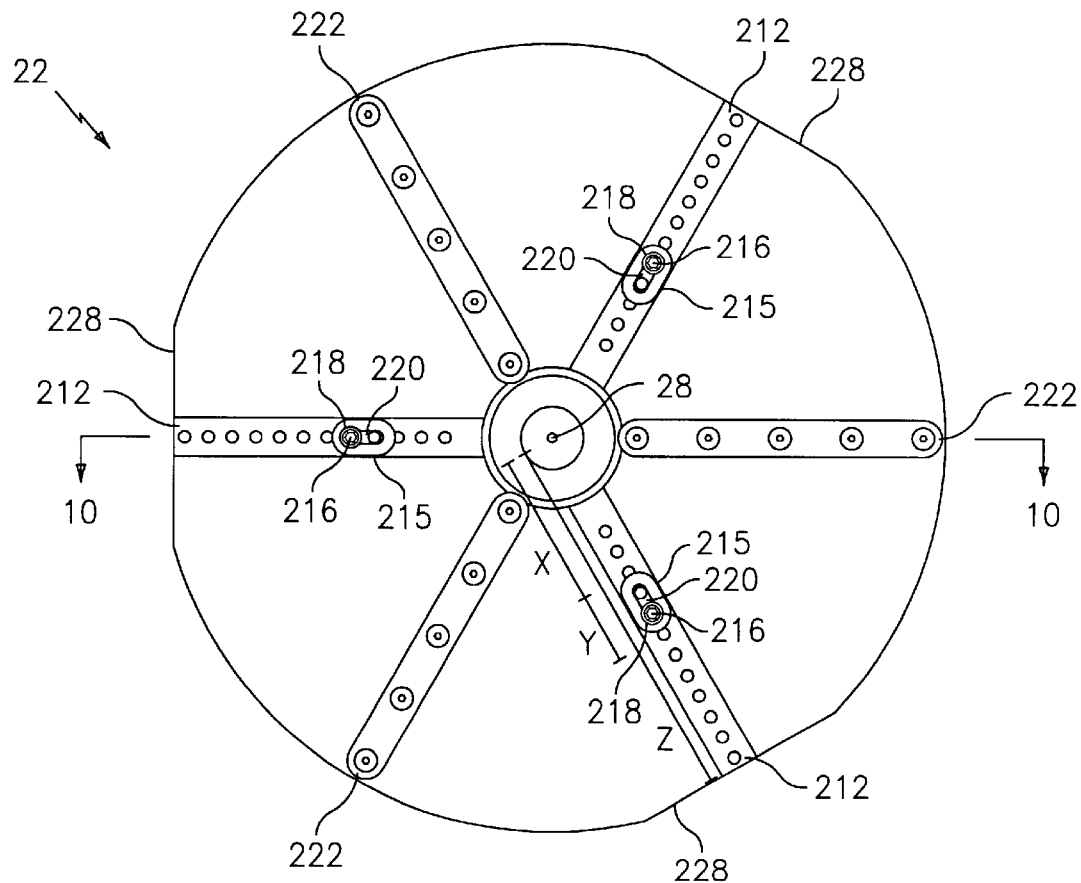
FIG. 8 is a top view of an EZ-MATE™ centerline hub shown in FIG. 1.
Figure 9:
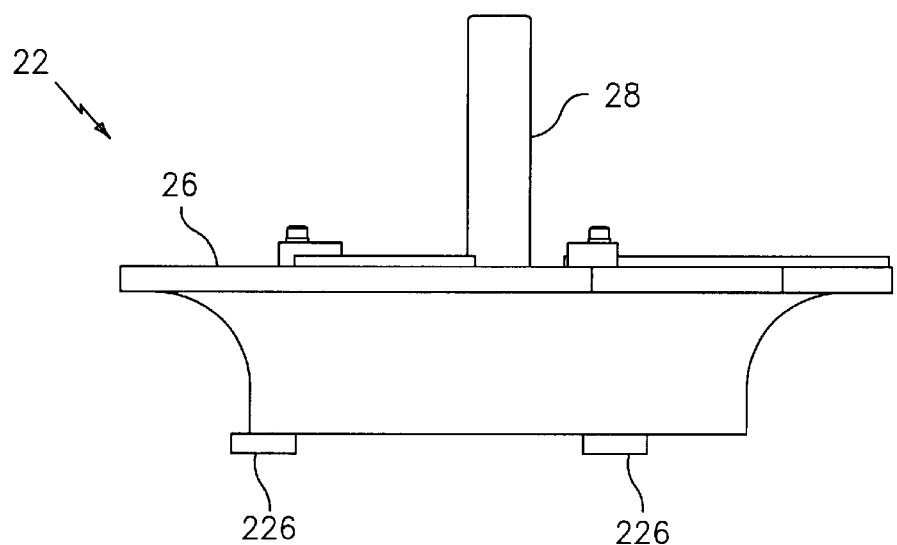
FIG. 9 is a side view of the centerline hub.
Figure 10:
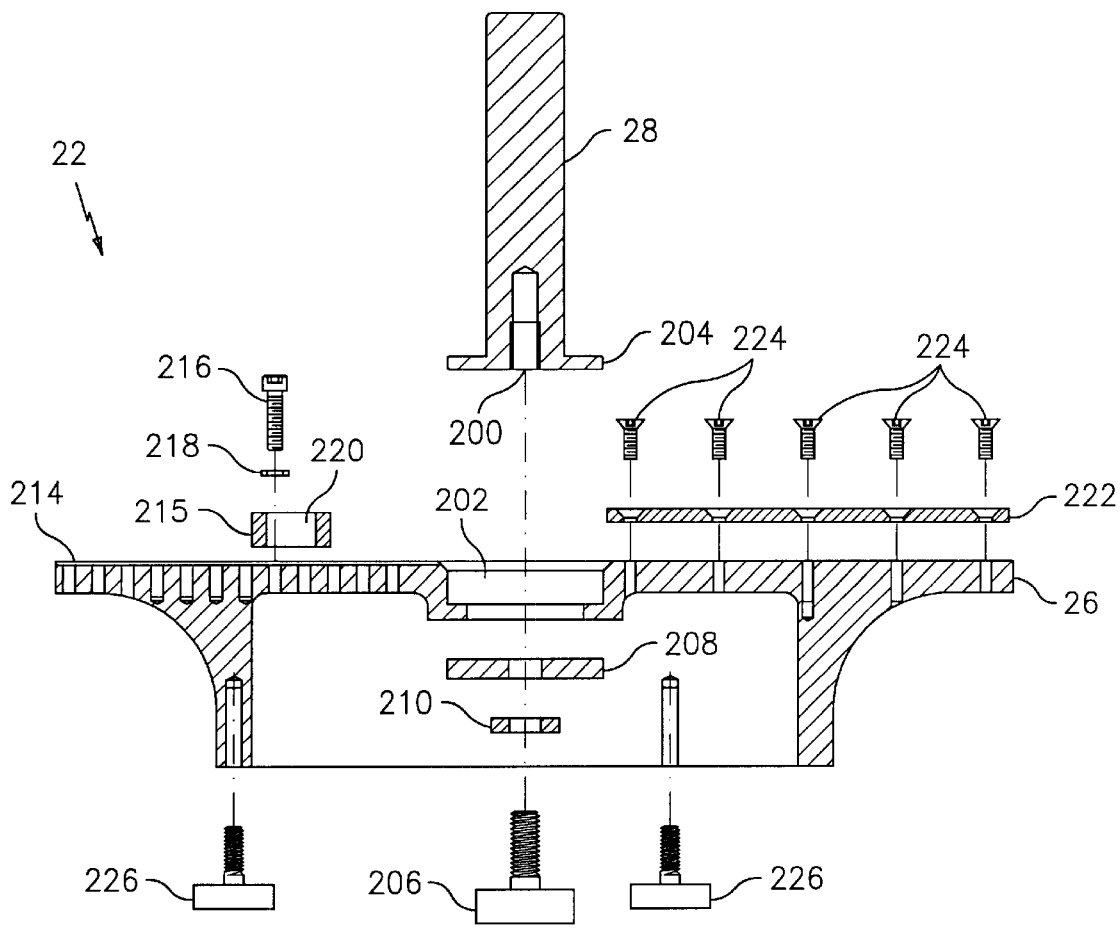
FIG. 10 is an exploded view of the centerline hub shown in FIGS. 8 & 9.

The position jaws 215 are first grossly adjusted by selecting appropriately positioned tap holes 214 and screwing the screws 216 through the jaws 215 and partially into the holes 214. With a six inch diameter part, for example, each jaw 215 is set to be approximately three inches away from the center of the body 26. Then, the jaws are finely adjusted by setting either the rod on a depth micrometer or a set of vernier calipers (not shown) to a calculated distance between a milled flat 228 and a near end of the jaws 215. In a case of testing the outside diameter of a part, this distance is generally calculated as: (length from center of body 26 to milled flat 228, which is a constant for a particular gage set)−(half the diameter of the part)−(the length of the jaws 215)−(0.01 inches for tolerance clearance). Referring to FIG. 8, this is given as (Z−X−Y−0.01 inches). Once the distance is determined, the base of the depth micrometer is located on the milled flat 228 on the perimeter of the EZ-MATE™ centerline body 26. Each position jaw is slid until it touches the rod of the depth micrometer or vernier calipers that is resting against the EZ-MATE™ body 26. The position on jaw 215 is locked in place with the socket head cap screw 216. This sequence is repeated for the two remaining position jaws 215. Note that the gross adjustment and fine adjustment may be done in one step, e.g., by moving the jaws 215 until they abut the depth micrometer and then screwing the screw into the nearest hole.

Next, the DIRECT-STYLE™ swing gage 24 is set to the diameter of part 32 to be inspected using, e.g., gage blocks or a reference master (not shown). The front and rear blocks 58, 60 are loosened and slid along the bars 34, 36 to the appropriate diameter of the part 32 to be checked. Set screws 230 (which, when tightened, contact the bars through the front and rear blocks), are tightened on the front and rear blocks to secure them in place.

The EZ-MATE™ centerline hub 22 is then placed on any surface and the part 32 to be measured is placed over the top of the body 26 such that it resides within the three position jaws 215. This will put the part 32 into position, thereby creating an actual centerline between the part 32 and centerline post 28 of the hub 22. Then, the two parallel slide bars 34, 36 of the DIRECT-STYLE™ swing gage 24 are straddled over the centerline post 28 such that the post 28 is located in the slotted opening 54 between the two bars 34, 36 and the roller bearings 42, 44 on the ends of the probes 46, 48 associated with the front and rear blocks 58, 60 are positioned at the diameter of the part 32 to be checked. In this position, the front and rear blocks 58, 60 lie over (or contact) the part 32 to be checked.

To check the size and out-of-roundness of the part 32, the user merely rotates the DIRECT-STYLE™ swing gage 24 about the centerline post 28 by grasping either one of the handles 120. As the DIRECT-STYLE™ swing gage 24 rotates, the roller bearings 42, 44 that are fastened to front and rear probes 46, 48 contact the inner or outer surface of the part 32. The user observes any needle movement on the dial indicator 62 to arrive at a quick and accurate objective judgement as to whether the part is within dimensional specifications, that is, whether or not the part 32 is within size and out-of-roundness parameters.

The EZ-MATE™ centerline hub 22 also allows for measurement of the part 32 by leaving the DIRECT-STYLE™ swing gage 24 stationary on the centerline post 28 and revolving the part 32 instead. This is extremely advantageous in the case of very thin-walled rings. Prior art gages do not have this ability.

If the user has gone through the relatively easy set up procedure described herein, then the centerline body 26 will be located at the actual centerline of the part 32. On the other hand, if the body is not located at the actual centerline of the part, for whatever reason, then, during part inspection, as the direct style swing gage 24 is rotated, the swing gage will "slide" or move laterally relative to the actual centerline and minimize the amount of error present in the measurement of the part.

As should be appreciated from the above description, the DIRECT-STYLE™ swing gage 24, during operation, can either rest on the part 32, or it can be positioned above the part 32 via the datum plate 38 and centerline post 28. This facilitates measuring irregularly-shaped and/or fragile parts.

Figure 11:
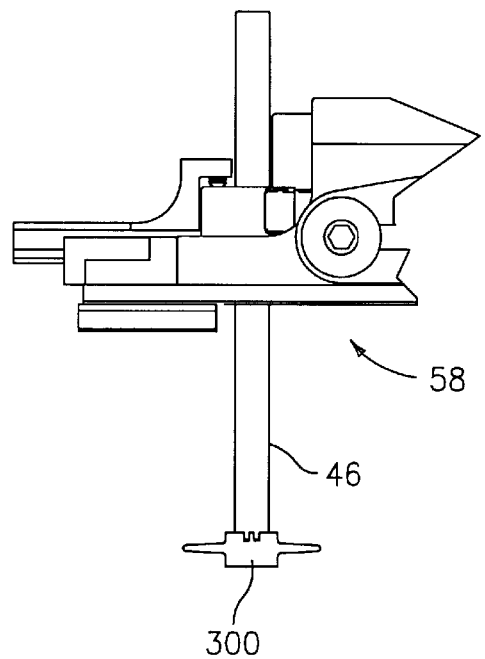
FIG. 11 is a side view of one end of the swing gage showing an alternative probe end-tip.

The gage 20 can also be provided with different types of probe tips in place of the roller bearings 42, 44. This might be done for measuring different types of parts. For example, FIG. 11 shows the front block 58 and probe 46. However, instead of the cylindrical roller bearing 42, a disc-shaped, or flanged, roller bearing 300 is attached to the end of the probe 46. The disc-shaped bearing 300 can be used to measure parts that have annular grooves or the like.

Figure 12:
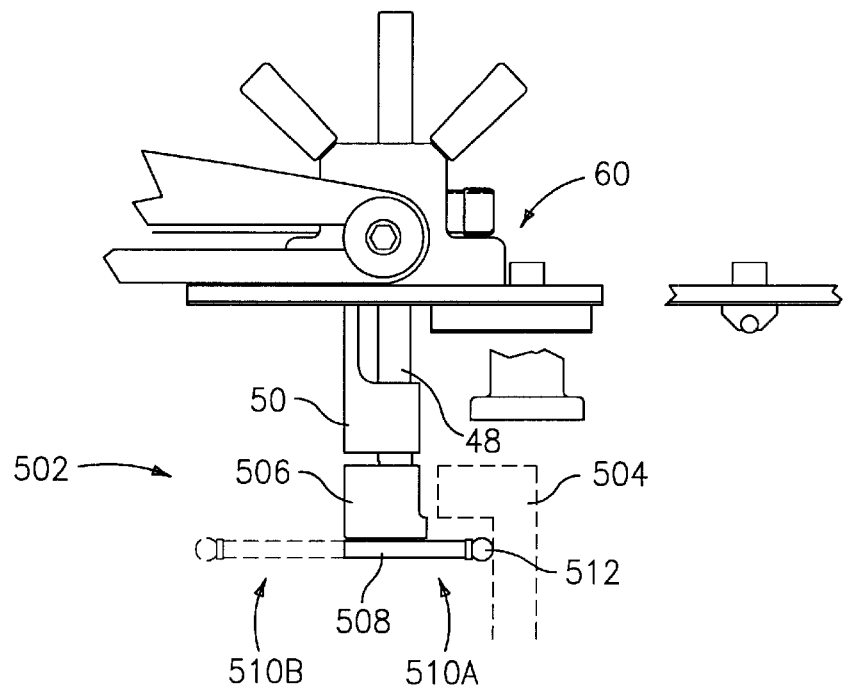
FIG. 12 is a side view of another end of the swing gage showing a second alternative probe end-tip.

FIG. 12 shows another alternative to the roller bearings 42, 44, this time a retractable probe tip 502. The retractable probe tip 502 is attached to the probe 48 of the rear block 60, and is used for measuring parts with flanges or lips, such as a part 504 shown in phantom in FIG. 12, whose inner or outer diameters would be difficult if not impossible to measure with the roller bearing-tipped probes.

The retractable probe tip 502 comprises a stationary base 506 and a probe disc 508. If the probe disc 508 was immobile, it would be difficult for a user to position the probe tip 502 within the flanged part 504. However, the probe disc 508 is movable between a first, "extended" position, shown at 510A, and a second, "retracted" position, shown at 510B. The probe disc 508 "locks" in both positions. This allows a user to retract the probe disc 508, position the probe tip 502 within the part 504, and then extend the probe disc 508. Once extended, a contact ball 512 attached to the probe disc 508 contacts the part 504 (provided the swing gage 24 has been previously grossly adjusted, with the contact ball 512 extended, using gage blocks or a reference master (not shown)). Then, the gage can be used in its normal manner as described above, with the contact ball 512 sliding along the part 504 as the swing gage 24 is rotated.

Since the variances in most measured parts will be very small, the retractable probe tip 502 is robust and built to close mechanical tolerances. FIGS. 13A–13F show its construction and operation in more detail.

The base 506 comprises a semi-cylindrical metal block, e.g, it is generally cylindrical except for one partially flat side 513. The base 506 has a main central bore 514, an internal lip 516 with its own, narrower bore 518, and a wide, shallow counterbore 520 on its underside. The base 506 also includes two deep pin holes 522, 524, located 180° apart from one another on either side of the narrow bore 518, and parallel to the flat 513. Also, a shallow pin hole 526 (compare FIG. 13A to FIG. 13D for relative depths) is located 90° apart from both deep pin holes 522, 524, opposite the flat 513. A spring-loaded key pin 528, 530 is respectively disposed in each deep pin hole 522, 524. The edges of the tips of the key pins are angled at 45°, while the central portions of the tips are angled at 5° to form shallow points. A spring-loaded pressure pin 532 (see FIG. 13F), having a shallow tip (again, the end of the pressure pin slopes outward at 5° to form the tip), is disposed within the shallow pin hole 526.

The probe disc 508 comprises a generally disc-shaped metal body 540, a central bore 542, and a retainer pedestal 544. The central bore 542 is provided with a flange 546. The top of the body 540 has two countersinks 548, 550, each of which has a 45° sloping edge. The countersinks are located 180° apart from one another, to either side of a tip portion 552 of the body 540 (into which the contact ball 512 is screwed or otherwise attached).

To assemble the retractable probe tip 502, a roller bearing 554 is positioned within the central bore 542 of the probe disc body 540, against the flange 546. Then, the upper edge of the retainer pedestal 544 is crimped over the roller bearing 554, holding the bearing in place. Next, the probe disc 508 is positioned against the base 506. The parts are dimensioned so that the base 506 only contacts the probe disc 508 via the roller bearing 554, so that there is a clearance between the probe disc 508 and base 506, and so that the probe disc 508 can rotate. The two are connected together, and to the probe shaft 48, via a fastener 556.

During use, in the extended position 510A, as shown in FIG. 13A, the countersinks 548, 550 are aligned with the deep pin holes 522, 524, respectively. In this position, the key pins 528, 530, by virtue of being spring loaded, engage the countersinks 548, 550 (that is, the angled tips of the key pins nestle into the angled countersinks). This prevents the probe disc 508 from rotating of its own accord, e.g., via gravity or frictional action on the contact ball 512. At the same time, the pressure pin 532 is forced against the top of the probe disc body 540. This prevents the probe disc 508 from rocking rearwards, as is possible because of the clearance between the probe disc 508 and base 506, as might interfere with an accurate measurement.

To retract the probe disc 508, a user simply grasps the contact ball or the probe disc body 540 and twists. Because the key pins 528, 530 and countersinks 548, 550 are angled at 45°, some resistance is provided, but not enough to prevent a user from causing the tips of the key pins to slide out of the countersinks via the angled edges. As the probe disc 508 is further rotated, the key pins and pressure pin slide along the top of the probe disc body 540. The slight points on all three serve to reduce friction. Once the probe disc 508 is rotated 90°, the pressure pin 532 encounters one of the countersinks 548, 550. However, since the tip of the pressure pin 532 is not angled at 45°, it does not significantly engage the countersinks. Once the probe disc 508 has been rotated 180°, the probe disc is in its retracted position, as shown in FIG. 12 at 510B, and the countersinks 548, 550 are aligned with the deep pin holes 524, 522, respectively. In this position, the key pins 528, 530 engage the countersinks, "locking" the probe disc into place.

The gage 20 of the present invention has been described in a preferred embodiment of the present invention as comprising a "set" made up of two components: the EZ-MATE™ centerline hub 22 and the DIRECT-STYLE™ swing gage 24. However, the invention is not to be limited as such. Each component 24, 22 by itself comprises features that, in combination, are considered to be novel, based on the known prior art gages.

Although the swing gage has been illustrated as comprising two parallel slide bars, one of ordinary skill in the art will appreciate that other support apparatuses or spacing elements for supporting the blocks could be used instead without departing from the spirit and scope of the invention. For example, two parallel slide bars could be affixed to the front block, such that the front block would not be moveable with respect to the slide bars, and with the rear block being slidable along the slide bars for adjusting the distance between the two blocks.

Since certain changes may be made in the above described gage set for measuring inside and outside diameters of ring shaped parts, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A gage set for measuring a characteristic of a part, said gage set comprising:
    a. a centerline hub comprising:
        (i) a body having a generally flat top surface;
        (ii) a post protruding up vertically from the top surface; and
        (iii) a plurality of positioning elements adjustably attachable to the top surface around the post and between the post and an edge of the top surface, wherein said positioning elements can be positioned around the post and attached to the top surface to hold the part by either an outer surface of the part or by an inner surface of the part and such that a center of the part is substantially aligned with a center of the post; and
    b. a gage comprising:
        (i) a support apparatus configured to straddle the post;
        (ii) a first block adjustably positionable along said support apparatus and having attached thereto an indicator with a spring-biased probe for contacting the part; and
        (iii) a second block adjustably positionable along said support apparatus and having a second probe for contacting the part; whereby when the positioning elements are appropriately adjusted to hold the part, and the first and second blocks are appropriately positioned and the gage is placed over the part and straddling the post, the second probe contacts the part and the spring-biased probe is biased against the part, such that when the gage is rotated the probes track along the part with the indicator indicating any movement of the spring-biased probe caused by variations in the part.

2. The gage set of claim 1 wherein the spring-loaded probe is laterally movably connected to the first block by way of a rail and carriage bearing assembly.

3. The gage set of claim 1 wherein the spring-biased probe and the second probe are each provided with a roller bearing for contacting the part, whereby scoring of the part by virtue of the probes contacting the part is substantially eliminated.

4. The gage set of claim 1 wherein the spring-biased probe and the second probe are respectively adjustably slidable through the first and second blocks such that the distance between the first block and an end of the spring-biased probe that contacts the part, and the distance between the second block and an end of the second probe that contacts the part, can both be adjusted.

5. A gage set for measuring a characteristic of a part, said gage set comprising:
    a. a centerline hub comprising:
        (i) a body having a generally flat top surface;
        (ii) a post protruding up vertically from the top surface; and
        (iii) a plurality of positioning elements adjustably attachable to the top surface around the post and between the post and an edge of the top surface, wherein said positioning elements can be positioned around the post and attached to the top surface to hold the part by either an outer surface of the part or by an inner surface of the part and such that a center of the part is substantially aligned with a center of the post; and
    b. a gage comprising:
        (i) a support apparatus configured to straddle the post;
        (ii) a first probe assembly comprising: a first block adjustably positionable along said support apparatus; an indicator attached to the first block; and a first probe operably interfaced with the indicator and laterally moveably connected to the first block via a rail and carriage bearing assembly and biased away from the first block via a spring, and said first probe having a first roller bearing attached thereto for contacting the part; and
        (iii) a second probe assembly comprising: a second block adjustably positionable along said support apparatus; and a second probe attached to the second block, wherein the second probe has a second roller bearing attached thereto for contacting the part; whereby when the positioning elements are appropriately adjusted to hold the part, and the first and second blocks are appropriately positioned and the gage is placed over the part and straddling the post, the second probe contacts the part and the first probe is biased against the part, such that when the gage is rotated the probes track along the part with the indicator indicating any movement of the first probe caused by variations in the part.

6. A gage for measuring a dimensional characteristic of a part, said gage comprising:

a. a support apparatus;

b. a first block adjustably positionable along said support apparatus and having an indicator mounted thereto, wherein a first probe for contacting the part is laterally movably connected to the first block via a rail and carriage bearing assembly and is operably interfaced with the indicator; and c. a second block adjustably positionable along said support apparatus and having a second probe attached thereto for contacting the part.

7. The gage of claim 6 wherein the first and second probes are each provided with a roller bearing for contacting the part, whereby scoring of the part by virtue of the probes contacting the part is substantially eliminated.

8. The gage of claim 7 wherein the second probe is supported by a probe support attached to the second block.

9. The gage of claim 6 wherein the second probe is supported by a probe support attached to the second block.

10. The gage of claim 6 wherein a support means for supporting the second probe is attached to the second block.

11. The gage of claim 6 wherein the second probe is adjustably slidable through the second block, and the first probe is adjustably slidable through the rail and carriage bearing assembly, such that the distance between the first block and an end of the first probe that contacts the part when the gage is used, and the distance between the second block and an end of the second probe that contacts the part when the gage is used, can both be adjusted.

12. The gage of claim 6 wherein the support apparatus is a pair of parallel slide bars with a space there between.

13. A gage for measuring a dimensional characteristic of a part, said gage comprising:

a. a support apparatus;

b. a first block adjustably slidable along said support apparatus and having an indicator mounted thereto and a first probe operably connected to the indicator, wherein the first probe is provided with a first roller bearing for contacting the part when the gage is used, whereby scoring of the part by virtue of the first probe contacting the part is substantially eliminated; and c. a second block adjustably slidable along said support apparatus and having a second robe for contacting art wherein the second robe is provided with a second roller bearing for contacting the part when the gage is used, and wherein the second probe is supported by a probe support attached to the second block.

14. A gage for measuring a dimensional characteristic of a part, said gage comprising:

a. a pair of parallel slide bars defining a space there between;

b. a first probe assembly comprising:
  (i) a first block adjustably slidable along said pair of slide bars;
  (ii) an indicator attached to the first block; and
  (iii) a first probe operably interfaced with the indicator and laterally moveably connected to the first block via a rail and carriage bearing assembly, and said first probe having a first roller bearing attached thereto for contacting the part when the gage is used; and c. a second probe assembly comprising a second block adjustably slidable along said pair of slide bars and a second probe attached to the second block, said second probe having a second roller bearing attached thereto for contacting the part when the gage is used.

15. A centerline hub for use with a gage for measuring a dimensional characteristic of a part, said centerline hub comprising:

a. a body having a generally flat top surface;

b. a post protruding up vertically from the top surface; and c. at least three groupings of tapped holes disposed in the top surface of the body, each of said groupings of holes comprising a linear array of holes extending generally radially away from the center of the body, and each grouping of holes having a positioning element associated therewith, said positioning elements each having an elongated clearance slot disposed there through for allowing the passage of a connector configured to mate with the tapped holes for removably securing the positioning elements to the body, whereby the positioning elements can be positioned to hold the part either by an outer surface of the part or an inner surface of the part and such that a center of the part is substantially aligned with a center of the post.

* * * * *

UNITED STATES PATENT AND TRADEMARK OFFICE
CERTIFICATE OF CORRECTION

PATENT NO.   : 6,634,114 B2                                                                Page 1 of 1
DATED        : October 21, 2003
INVENTOR(S)  : Steven T. Bidwell It is certified that error appears in the above-identified patent and that said Letters Patent is hereby corrected as shown below:

<u>Column 11,</u>
Line 42, change "contacting art" to -- contacting the part --.

Signed and Sealed this

Second Day of March, 2004

JON W. DUDAS
*Acting Director of the United States Patent and Trademark Office*